United States Patent [19]

Kaplan et al.

[11] Patent Number: 5,181,677
[45] Date of Patent: Jan. 26, 1993

[54] SLIDING AIRCRAFT DOOR

[76] Inventors: Abraham M. Kaplan; Joyce Kaplan, both of 10431 Mira Vista, Tustin, Calif. 92705

[21] Appl. No.: 767,035

[22] Filed: Sep. 26, 1991

[51] Int. Cl.$^5$ .............................................. B64C 1/14
[52] U.S. Cl. ................................. 244/129.5; 244/129.4
[58] Field of Search .......................... 244/129.4, 129.5; 49/404, 409, 410; 220/346, 347

[56] References Cited

U.S. PATENT DOCUMENTS

| | | | |
|---|---|---|---|
| 2,345,512 | 3/1944 | Treptow | 244/129.5 |
| 2,445,131 | 7/1948 | Wartian | 244/129.5 |
| 2,519,386 | 8/1950 | Loving | 244/129.5 |
| 2,549,110 | 4/1951 | Michael | 244/129.4 |
| 4,125,235 | 11/1978 | Fitzgerald et al. | 244/129.5 |
| 4,375,876 | 3/1983 | Stewart | 244/129.5 |

FOREIGN PATENT DOCUMENTS

| | | | |
|---|---|---|---|
| 8400786 | 3/1984 | European Pat. Off. | 244/129.5 |
| 223596 | 11/1968 | U.S.S.R. | 244/129.5 |

Primary Examiner—Joseph F. Peters, Jr.
Assistant Examiner—Anne E. Bidwell
Attorney, Agent, or Firm—Charles H. Thomas

[57] ABSTRACT

A door assembly is provided for an aircraft that has a fuselage with a protective skin and an access opening therein. The door assembly includes a pair of parallel tracks mounted on opposite sides of an access opening in the fuselage. A sliding door is secured to the tracks and is mounted thereon for reciprocal movement therealong. Some releasable restraining mechanism is provided for immobilizing the door relative to the tracks. A sliding aircraft door according to the invention allows openings of greater size to be employed in aircraft. Also, the system is far less complex, more economical to build, and lighter in weight then conventional aircraft door assemblies. The reduced weight results in greater fuel economy during flight, while the simplicity of construction reduces the likelihood of a malfunction in the door mechanism.

17 Claims, 6 Drawing Sheets

SLIDING AIRCRAFT DOOR

BACKGROUND OF THE INVENTION

1. Field of the Invention

The present invention relates to a door assembly for use on an aircraft.

2. Description of the Prior Art

In commercial aircraft which are utilized today each aircraft has a fuselage in which a number of access openings are provided. Each access opening is equipped with a door. The conventional aircraft doors which are utilized to close access openings in an aircraft are quite complex and costly. Each door requires a complex hinge system in which a door is opened by first unlocking the door then pushing the door outwardly from the plane of the protective skin of the aircraft fuselage. Once the door has been pushed out from the plane of the surrounding skin of the aircraft it is opened by being swung in an arc about its hinges. The procedure is reversed in order to close a conventional aircraft door.

Because a conventional aircraft door must be capable of both translational and rotational movement, the hinge mechanism by means of which the door is attached to the fuselage of the aircraft is quite complex. As a result of this complexity conventional aircraft doors are quite costly to manufacture. Furthermore, the intricacy and complexity of the hinge mechanism enhances the likelihood of a malfunction.

Another problem that exists with conventional aircraft door closure systems is excessive weight. Due to the complexity and the many necessary parts in a conventional aircraft door assembly, the weight of such an assembly is rather large. In the aircraft industry weight is an extremely important consideration, and all possible measures are taken to reduce the weight of each and every component on an aircraft. However, even though weight is such an important factor in aircraft construction, conventional aircraft doors are still inordinately heavy.

Still another disadvantage of conventional aircraft door assemblies is that due to the complex hinge mechanism that is required, the sizes of the conventional aircraft doors must be limited. This is because there is a great cantilevered load which acts upon the hinge mechanisms when the doors are opened. As a consequence, the sizes of the access openings into which conventional aircraft doors are mounted must be limited in order to avoid hinge mechanisms which have an even greater weight. The limited size of the access openings reduces the speed with which both cargo and passengers can be loaded onto and unloaded off of an aircraft. Furthermore, the limited size of access openings in a conventional aircraft restricts the rate at which passengers can exit an aircraft in an emergency. This creates an important concern for passenger safety. The restricted size of the openings thereby creates problems of convenience, safety and cost in loading and unloading an aircraft.

SUMMARY OF THE INVENTION

One object of the present invention is to provide an aircraft door assembly which is markedly lighter in weight than a conventional aircraft door assembly of comparable size. By reducing the weight of an aircraft door the speed of flight of an aircraft can be increased and the consumption of fuel in flight can be decreased. Both of these benefits are very important in the aircraft industry.

Another object of the invention is to provide an aircraft door assembly which is much simpler in design and construction than conventional aircraft door assemblies. The aircraft door assembly of the invention includes a door that slides along a pair of tracks to alternatively cover and uncover an access opening in the fuselage of an aircraft. Thus, the door undergoes no rotational motion but only translational movement, and requires no hinges. This greatly simplifies the structure required in the aircraft door assembly of the invention.

The simplicity of construction of the aircraft door assembly of the invention results in a reduced cost of manufacture, as well as a reduction in weight. Furthermore, the simplicity of construction also reduces the likelihood of component failure, thereby reducing the incidence of equipment malfunction in the door assembly. Moreover, the simplicity of construction reduces the complexity of the operation of the door assembly. That is, with the door assembly of the invention the aircraft door is opened and closed by merely sliding the door along a pair of parallel tracks. The door moves only in translation, and does not move in rotation. No hinges are required in the door assembly of the invention. Furthermore, no special instructions or operating techniques are required to open and close the improved aircraft door assembly of the invention.

In one broad aspect the present invention may be considered to be an improvement in an aircraft having a fuselage with a protective skin through which an access opening is defined. The improvement of the invention is comprised of a pair of parallel tracks spanning the access opening. The tracks are anchored to the fuselage on opposite sides of the access opening in the skin. A door is secured to the tracks and mounted for sliding reciprocal movement therealong. A means is provided for releasably immobilizing the door relative to the tracks.

In another broad aspect the invention may be considered to be an access closure for an aircraft having a fuselage with a protective skin and an access opening therein. The access closure of the invention is comprised of a pair of parallel tracks mounted on opposite sides of the access opening, as well as a sliding door and releasable restraining means. The sliding door is secured to the tracks and mounted thereon for reciprocal movement therealong. The releasable restraining means serves to immobilize the door relative to the tracks, when desired.

Preferably the tracks are comprised of projecting rails that are spaced outwardly from the protective skin of the aircraft. The rails define parallel channels on opposite sides of the access opening. The rails are directed away from each other and also away from the access opening and are oriented parallel to the protective skin of the fuselage. Opposing edges of the door are provided with a mating set of rails which are directed toward each other and toward the access opening. These mating rails on the door edges ride in the channels defined between the skin of the aircraft and the rails that are anchored to the fuselage.

The means for releasably immobilizing the door is preferably comprised of a plurality of shear pins mounted within the fuselage and movable between extended positions of engagement with the door and retracted positions of withdrawal from the door. A plurality of sockets are preferably defined in the door to face the fuselage. These sockets are adapted to receive the movable shear pins.

An aircraft fuselage has a longitudinal axis and the door assembly of the invention is preferably mounted such that the tracks that are anchored to the fuselage extend fore and aft relative to the longitudinal axis. These tracks are located above and below the access opening in the skin of the aircraft.

Since the sliding door is not flush with the surface of the skin of the aircraft fuselage, fairing is preferably provided at the edges of the door and on the protective skin about the opening. The use of fairing about the door edges reduces turbulence and drag of air rushing past the aircraft.

The invention may be described with greater clarity and particularity with reference to the accompanying drawings.

DESCRIPTION OF THE EMBODIMENTS

Figure 1:
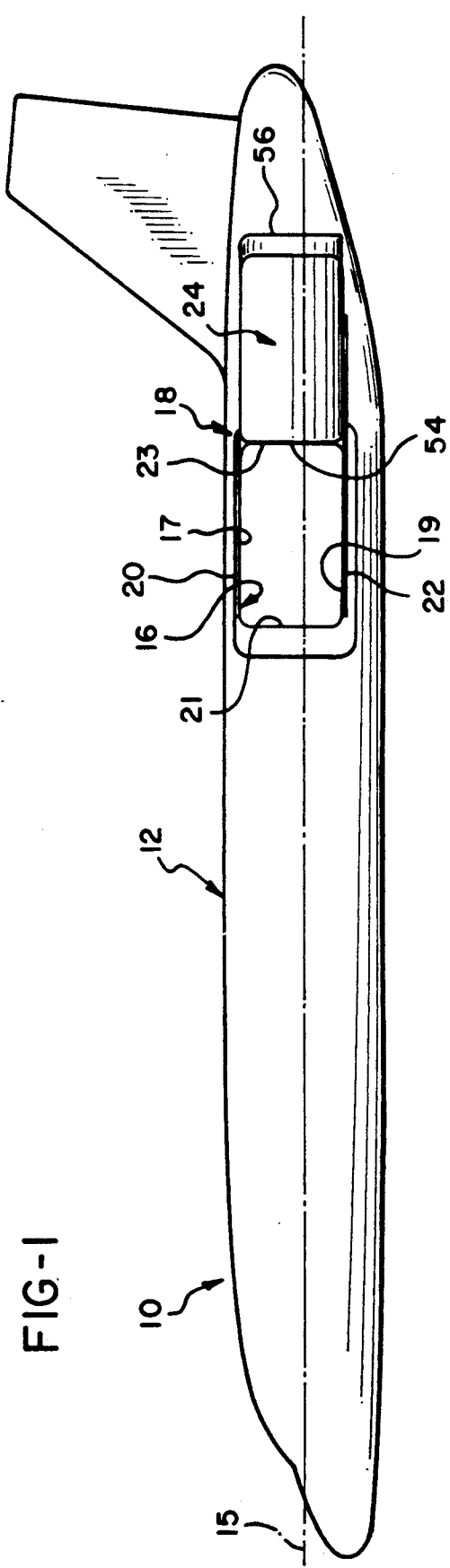
FIG. 1 is a side elevational diagram of an aircraft having a door assembly according to the invention shown in the open position.
Figure 2:
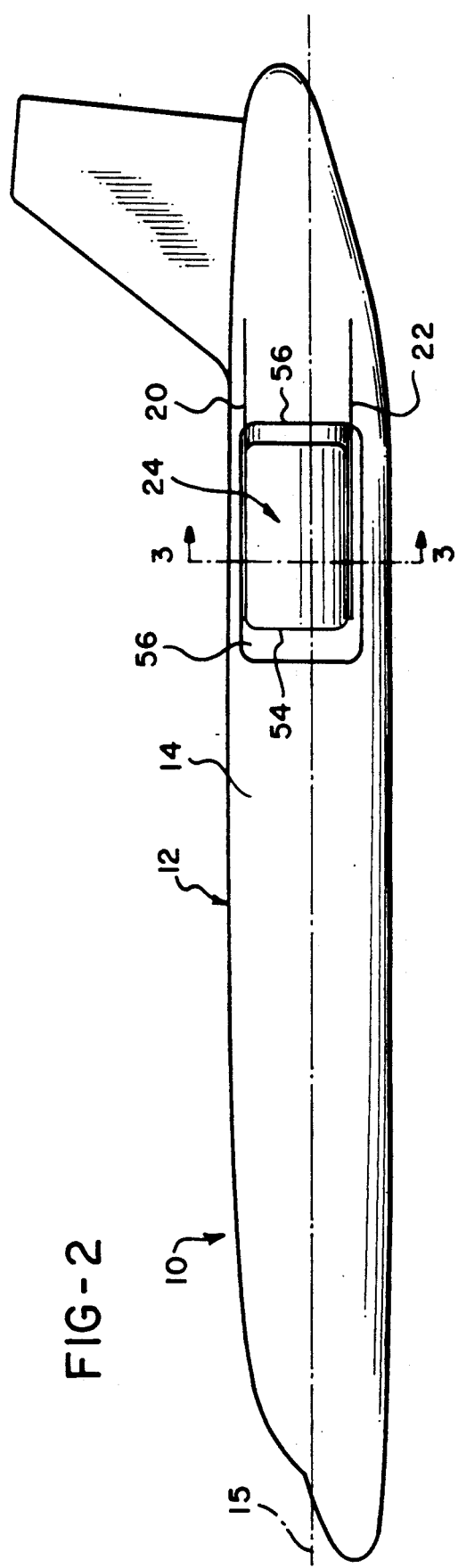
FIG. 2 is a side elevational diagram showing the aircraft of FIG. 1 with the door assembly of the invention in the closed position.

FIGS. 1 and 2 are diagrammatic elevational views of an aircraft 10 having a typical fuselage 12 which is covered by an outer skin 14. The fuselage has a conventional alignment along a longitudinal axis indicated at 15. As best illustrated in FIG. 1, an access opening 16 of a generally rectangular configuration is defined through the skin 14 of the fuselage 12. The access opening 16 has mutually parallel linear top and bottom edges 17 and 19 and mutually parallel arcuate fore and aft edges 21 and 23.

Figure 3:
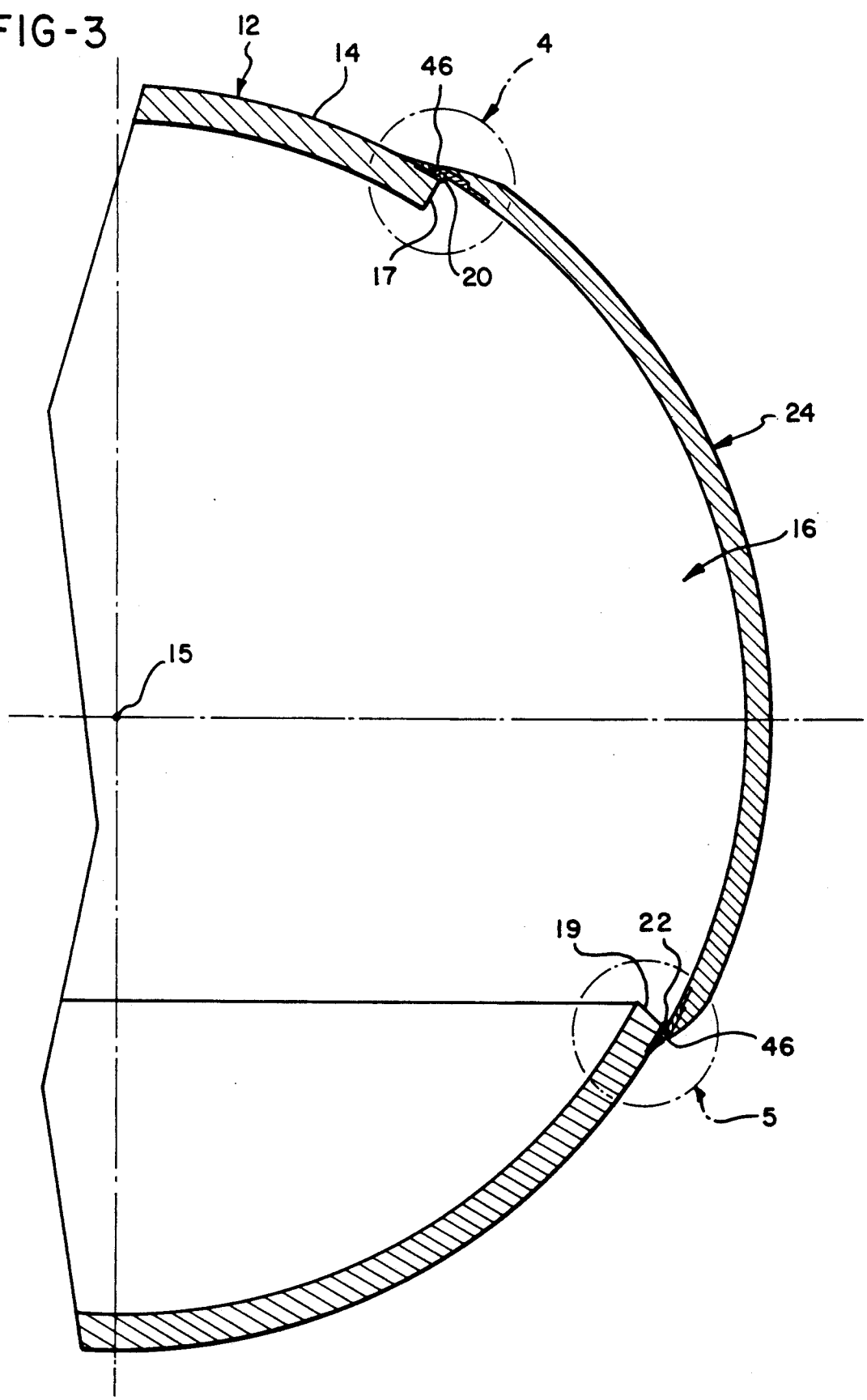
FIG. 3 is the right half of a cross sectional elevational view taken along the lines 3—3 of FIG. 2.

The invention is an aircraft door assembly indicated generally at 18. The door assembly 18 is comprised of a pair of tracks 20 and 22, visible in FIG. 3 and illustrated respectively in greater detail in FIGS. 4 and 5. As shown in FIG. 3 the tracks 20 and 22 are parallel to each other and are secured to the fuselage 12 on opposite sides of the opening 16 at the edges 17 and 19 thereof respectively. A door 24 is secured to the tracks 20 and 22 and is mounted to slide along the tracks 20 and 22 to alternatively cover the access opening 16, as illustrated in FIG. 2, and to uncover the access opening 16 as illustrated in FIG. 1. The door 24 has top and bottom parallel linear edges 32 and 34, respectively, and arcuate parallel fore and aft edges, indicated at 54 and 56, respectively.

The door assembly 18 is further comprised of a means for immobilizing the door 24 relative to the tracks 20 and 21 in the position of FIG. 2 wherein the door 24 covers the opening 16. This means for immobilizing the door 24 relative to the tracks 20 and 22 is comprised of a vertical row of shear pins 26 located fore and aft of the opening 16 at the edges 21 and 23 thereof.

Figure 4:
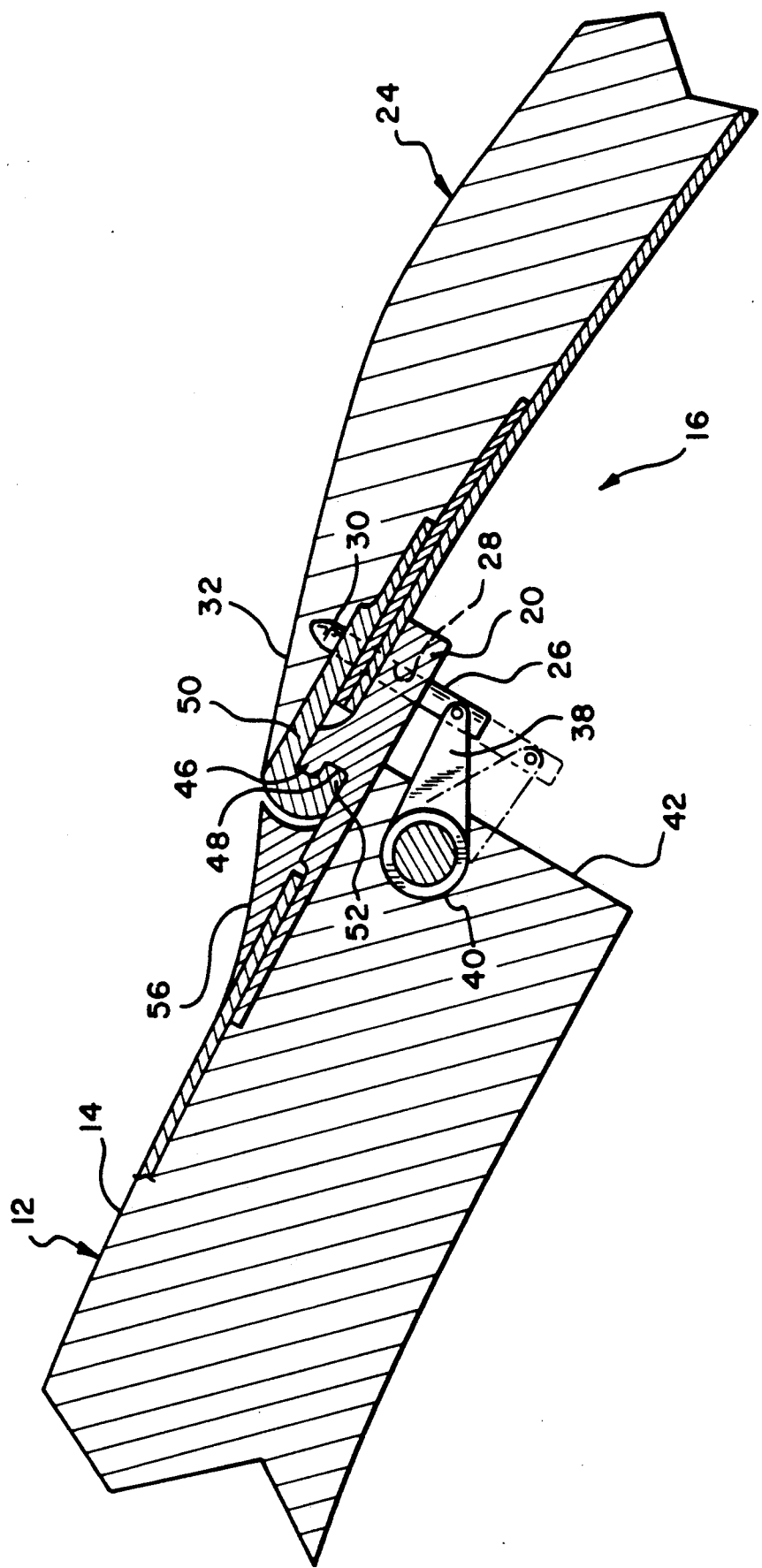
FIG. 4 is a sectional elevational detail of the location indicated at 4 in FIG. 3.

As illustrated in FIG. 4 the shear pins 26 are formed as narrow, cylindrical rod-like structures with tapered ends which are directed substantially radially outwardly from the center of the fuselage 12. The shear pins 26 slide through cylindrical apertures 28 that extend radially outwardly through the bases of the tracks 20 and 22 and into blind ended sockets 30 which are defined in the inwardly facing surface of the door 24 proximate to the door edges 32 and 34, illustrated in FIG. 4 and 5, respectively. The sockets 30 receive the shear pins 26 when the door is moved to the closed position of FIG. 2. When the door 24 is in this position the sockets 30 are in coaxial alignment with the apertures 28 that extend through the tracks 20.

The shear pins 26 are pivotally mounted on lever arms 38 that are secured to and extend radially from the axes of pin torque tubes 40 and 41. Each pin torque tube carries a plurality of arms 38. Each of the arms 38 carries a single shear pin 26 which is pivotally mounted thereon. The pin torque tubes 40 and 41 are longitudinally aligned in a fore and aft direction relative to the fuselage 12 and are rotatable relative thereto. The shear pins 26 are each carried on a separate arm 38, but the arms 38 are all rigidly secured to the pin torque tubes 40 and 41. The plurality of shear pins 26 that pass through each of the tracks 20 and 22 are thereby gang connected and are movable in unison to alternatively engage and disengage the door 24 by virtue of engagement in the sockets 30. The shear pins 26 thereby perform the function of a releasable restraining means to alternatively immobilize the door 24 completely relative to the fuselage 12, or to permit the door 24 to slide longitudinally relative to the fuselage 12.

The pin torque tube 40 moves the shear pins 26 in tandem at the upper door edge 32 and the pin torque tube 41 moves the shear pins 26 connected thereto at the lower edge 34 of the door 24. The pin torque tube 40 is rotatable in a counterclockwise direction, as viewed in FIG. 4, so as to concurrently engage the shear pins 26 in the sockets 30 as indicated in solid lines in FIG. 4. Alternatively, the pin torque tube 40 may be rotated in a clockwise direction to disengage the shear pins 26 from the sockets 30. The cylindrical openings 28 in the track bases guide the shear pins 26 in their reciprocal movement. The movement of the torque pin tube 41 is similar to that of the torque pin tube 40. However, clockwise rotation of the torque pin tube 41 engages the shear pins 26 carried on the arms 38 in the door sockets 30 while counterclockwise rotation of the torque pin tube 41 disengages the shear pins 26.

As illustrated in FIG. 1, the access opening 16 has an upper edge 17 and a lower edge 19, both of which are longitudinally aligned relative to the fuselage 12. The tracks 20 and 22 are respectively mounted adjacent the upper and lower edges 17 and 19 of the access opening 16 and in alignment therewith.

Figure 5:
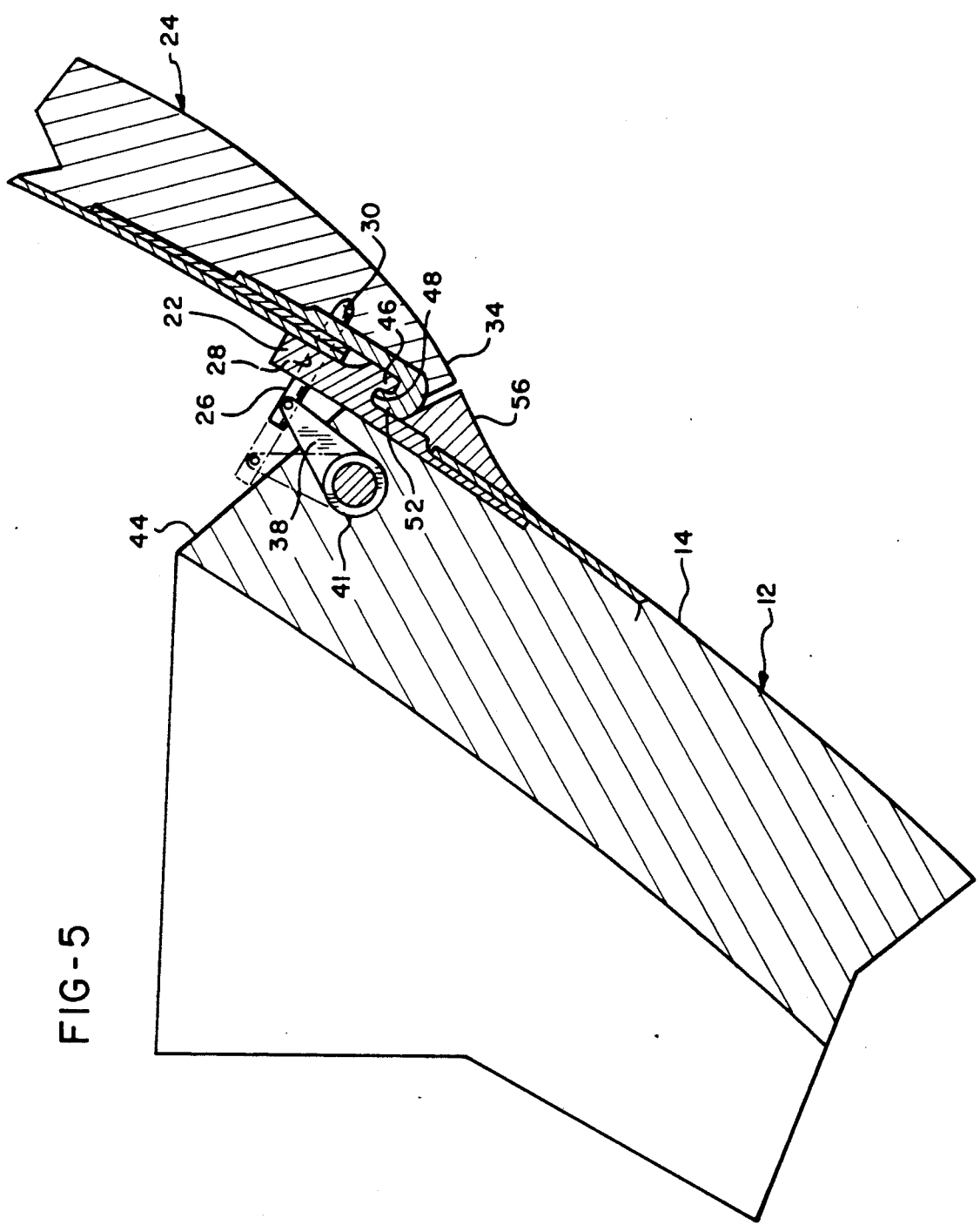
FIG. 5 is a sectional elevational detail of the location indicated at 5 in FIG. 3.

The tracks 20 and 22 are both provided with rails 46 which project away from the access opening 16 and in opposite directions from each other, as depicted in FIGS. 3, 4 and 5. The rails 46 thereby define a pair of concave channels 48 in the tracks 20 and 22. At the upper and lower edges 32 and 34 of the sliding door 24 there are generally "J-shaped" edge rails 50 which have turned over lips 52 that serve as channel followers in the tracks 20 and 22. The rail lips 52 of the top and bottom door rails 50 ride in the channels 48 in the tracks 20 and 22 in longitudinally reciprocal fashion.

As is evident from FIGS. 4 and 5, the door rail edge lips 52 and the track rails 46 interengage each other to resist hoop stress applied between the fuselage 12 and the sliding door 24. Due to this interlocking engagement the door 24 cannot separate from the fuselage 12 despite the rather great pressure differential that exists between the relatively high pressure air in the interior of the fuselage 12 and the surrounding low pressure of the atmosphere through which the aircraft 10 travels.

As best illustrated in FIGS. 4 and 5, the top and bottom edges 32 and 34 of the sliding door 24 are tapered from a greater thickness at the interior of the structure of the sliding door 24 to a minimum thickness at the peripheral extremities of the edges 32 and 34. Likewise, the fore and aft sliding door edges 54 and 56 are also tapered from a greater thickness toward the center of the sliding door 24 to a minimum thickness at the fore and aft extremities thereof. This tapered configuration serves as fairing about the entire periphery of the sliding door 24.

Also, and as best illustrated in FIGS. 4 and 5, the fuselage 12 includes fairing in the form of an outwardly projecting boundary structure 56 that surrounds the opening 16. The boundary 56 is thickest immediately adjacent the facing edges of the sliding door 24 and thinnest remote therefrom. The outer surface of the fairing of the boundary structures 56 blends into the fairing formed by the reduced thickness at the edges 32, 34, 54 and 56 of the sliding door 24 so as to minimize turbulence of air flow over the surface of the fuselage skin 14 and over the outer surface of the sliding door 24.

The operation of the sliding door 24 may be explained with reference to the drawings. During the loading process the sliding door 24 is pushed aft as depicted in FIG. 1. The channel followers 52 at the top and bottom edges 32 and 34 of the sliding door 24 slide easily in an aft direction in the channels 48 defined in the tracks 20 and 22. The access opening 16 is thereupon fully exposed and is uncovered by the sliding door 24 as depicted in FIG. 1. When the sliding door 24 is fully opened as illustrated in FIG. 1, cargo or passengers can be loaded through the access opening 16. It should be noted that the access opening 16 is substantially larger than conventional aircraft door openings.

Once loading has been completed, the sliding door 24 is pushed forward relative to the fuselage 12 to the closed position depicted in FIG. 2. Again, the channel followers 52 of the top and bottom edge rails 50 of the sliding door 24 slide easily along the channels 48. When the sliding door 24 reaches the fully closed position depicted in FIG. 2, the pin torque tubes 40 and 41 are rotated to push the shear pins 26 entirely through the apertures 28 in the bases of the tracks 20 and 22 and into the sockets 30 at the top and bottom edges 32 and 34. The uppermost pin torque tube 40 at the top edge 17 of the opening 16 is rotated counterclockwise to push the shear pins 26 that are carried on the arms 38 thereof in unison into the sockets 30 that face the fuselage 12 near the upper edge 32 of the sliding door 24. Similarly, the pin torque tube 41 at the lower edge 19 of the opening 16, illustrated in FIG. 5, is rotated in a clockwise direction to move the shear pins 26 connected thereto in unison and to engage them in the aligned sockets 30 in the inner face of the door 24 near the lower edge 34 thereof.

When the sliding door 24 has been closed and the shear pins 26 engaged in this manner, the door 24 is immobilized relative to the tracks 20 and 22 and relative to the fuselage 12.

As shown in FIGS. 3, 4 and 5 the edge rails 50 at the top and bottom edges 32 and 34 of the sliding door 24 are engaged with the tracks 20 and 22 that are secured to the fuselage in such a manner that the sliding door 24 cannot be separated from the fuselage 12 as a result of a greater pressure within the fuselage than outside of the fuselage 12. Quite to the contrary, a much greater pressure within the fuselage 12 than in the surrounding, ambient atmosphere will serve only to tighten the interlock between the sliding door rails 50 and the tracks 20 and 22. The door assembly 18 of the invention thereby has a considerable hoop strength to prevent the door 24 from being blown off of the aircraft 10 as a result of high pressure differential between the interior of the aircraft and the surrounding atmosphere.

For a small aircraft it is sufficient to provide only four of the shear pins 26 in order to immobilize the sliding door 24. In a small aircraft one shear pin 26 slides into an aligned socket 30 at each of the four corners of the sliding door 24. In a small aircraft the door must resist shearing forces on the order of 500 pounds per running inch parallel to the fuselage axis 15.

Figure 6:
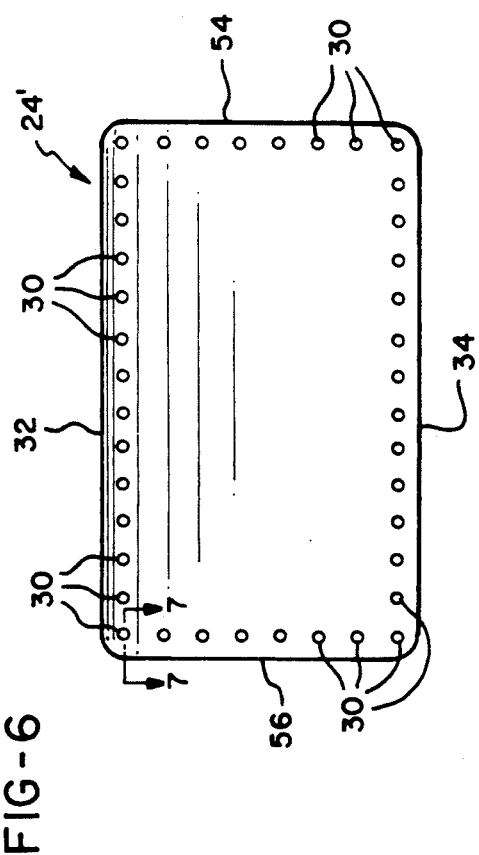
FIG. 6 is an elevational view of the inside surface of an alternative embodiment of an aircraft door according to the invention.

For larger aircraft greater structural rigidity may be required. FIG. 6 is a diagram of the inside surface of a sliding door 24' which faces the fuselage of a large aircraft, such as a Boeing 747 or a McDonnell Douglas DC 10. The sliding door 24' depicted in FIG. 6 is provided with both vertical columns of sockets 30 at each of the opposite edges 54 and 56, and also longitudinal rows of sockets 30 aligned near the upper edge 32 and the lower edge 34 thereof. Each of the sockets 30 is designed to receive a separate shear pin 26, although the shear pins 26 are operated in unison. The vertical columns of shear pins which engage the sockets 30 at the opposite ends 54 and 56 of the sliding door 24' provide both axial reinforcement and resistance to shear. The shear pins 26 which engage the horizontal rows of sockets 30 along the upper edge 32 and the lower edge 34 of the door 24' provide resistance to the shearing forces that act on the door 24'. By providing rows and columns of shear pins 26 and sockets 30 for engagement of those shear pins, high speed flutter of the sliding door 24' relative to the fuselage 12 can be eliminated.

Figure 7:
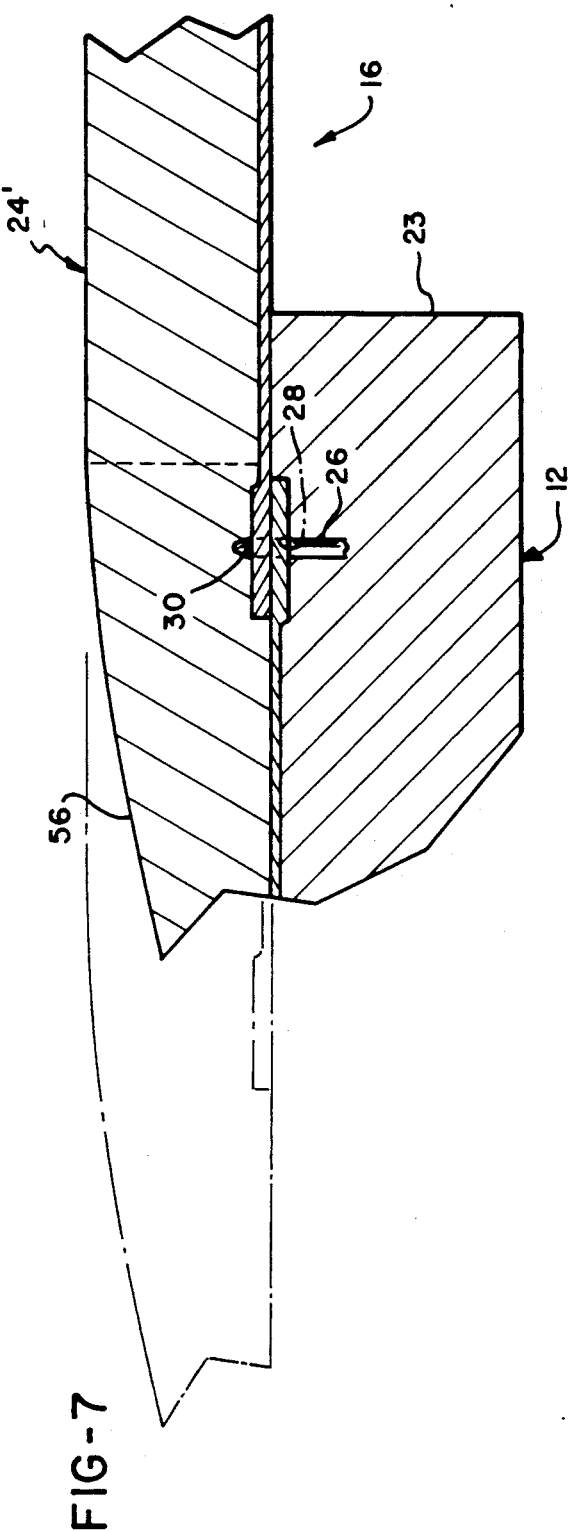
FIG. 7 is a top plan detail at the aft end of a door assembly employing the door of FIG. 6.

FIG. 7 is a top plan detail at the aft end of the door 24' showing the aft vertical row of shear pins 26. At the forward end of the opening 16 there is a similar vertical row of shear pins 26. FIG. 7 is a plan section taken along the lines 7—7 of FIG. 6 showing the manner in which the aft vertical column of shear pins 26 engages the sockets 30 near the aft edge 56 of the door 24'. When the shear pins 26 are withdrawn in unison the door 24' can slide along the tracks 20 and 22 to the rear as indicated in phantom in FIG. 7. Alternatively, when the door 24' has been moved longitudinally forward along the tracks 20 and 22 to the position in which the shear pins 26 are aligned with the sockets 30, the shear pins 26 are pushed outwardly from the fuselage 12 and into the sockets 30 to securely immobilize the sliding door 24' relative to the fuselage 12. In a large aircraft the shear pins 26 which fit into the sockets 30 depicted in the embodiment of FIG. 6 can resist forces on the order of 2500 pounds per linear inch applied along the length of the door 24' from the leading forward edge 54 to the trailing or aft edge 56.

Figure 8:
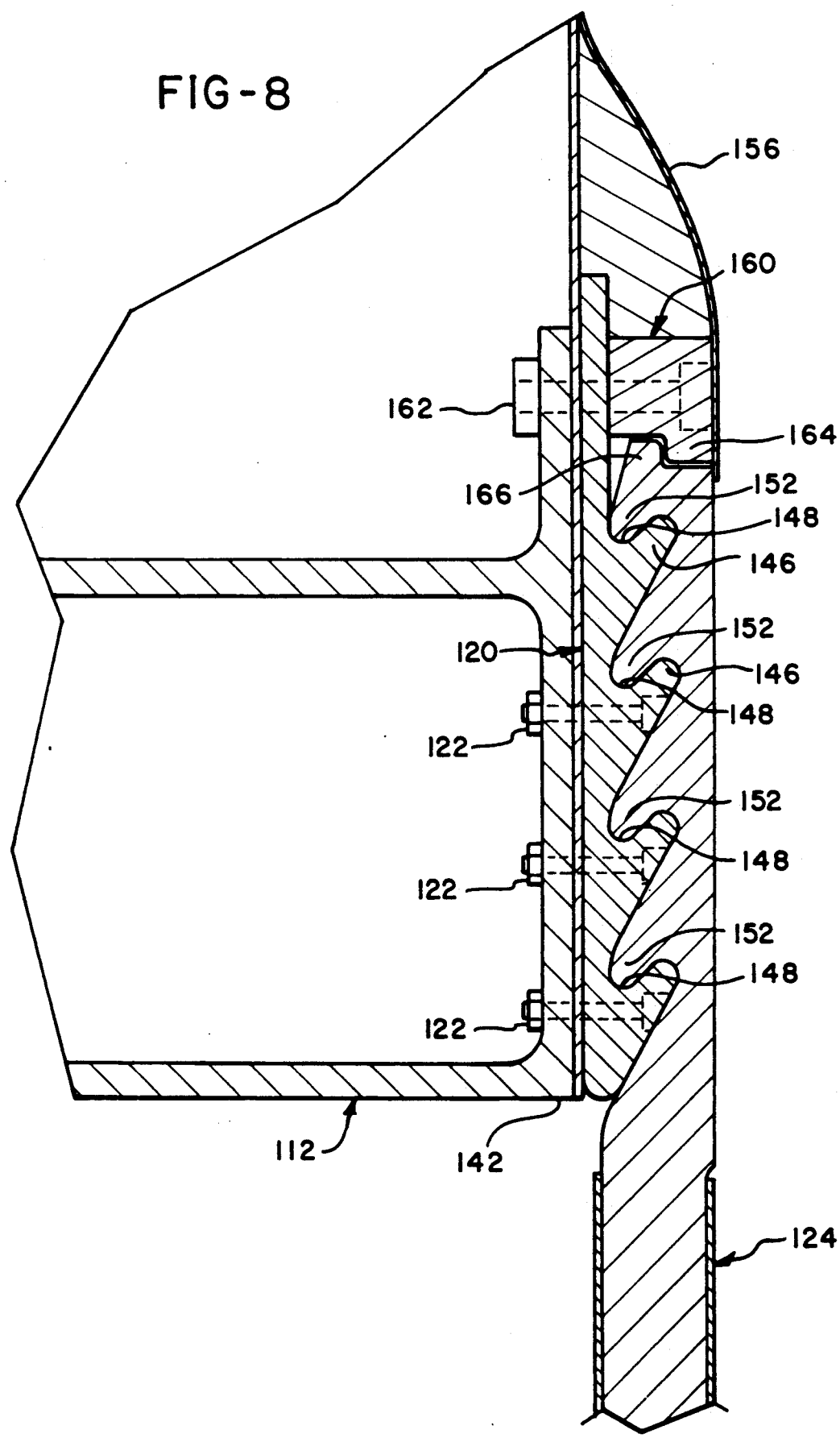
FIG. 8 is a sectional elevational detail illustrating an alternative track mechanism to that depicted in FIG. 4.

While the single interlocking channel follower 52 on the longitudinal edge rail 50 of the sliding door 24 may be adequate for use at the top and bottom of the door 24' depicted in FIGS. 2-4, a more secure track engagement arrangement may be appropriate for larger aircraft. FIG. 8 is a cross sectional elevational detail showing a track arrangement designed for use on a large aircraft. The structural members of the fuselage are indicated generally at 112. A track 120 is secured to the fuselage 112 by means of a plurality of bolts 122. The track 120 is formed with a plurality of rails 146. FIG. 8 is a cross sectional elevational detail of the top edge 142 of an access opening in an aircraft, so that the rails 146 project upwardly. A corresponding track with downwardly projecting rails would be provided along the lower edge of the access opening.

The upper edge of the sliding door 124 is provided with a plurality of downwardly inclined channel followers 152 which ride in channels 148 defined directly adjacent to each of the rails 146. The door 124 slides longitudinally fore and aft relative to the fuselage 112, with the channel followers 152 riding along the channels 148 defined directly to the left of the rails 146 depicted in FIG. 8. By providing a track system with a plurality of track followers along each of the upper and lower edges of the door 124, the door assembly of the invention is provided with greater stability and rigidity.

The embodiment of FIG. 8 also employs a further safety feature in the form of a fail-safe retainer 160. The retainer 160 is a longitudinal strip which is bolted to the outside of the fuselage 112 by means of longitudinally spaced bolts 162. The border 156 about the door access opening is faired into the top edge of the retainer 160. The retainer 160 has an overhanging retaining lip 164 that extends longitudinally fore and aft directly above the sliding door 124. The sliding door 124 has upper and lower projecting ribs 166 that are located inwardly toward the aircraft fuselage relative to the retaining lips 164. The retaining lips 164 ensure that the ribs 166 are laterally retained within their confines, so that even if a very large internal pressure is applied against the interior of the sliding door 124, the door 124 cannot be forced away from the aircraft. Rather, the retaining lips 164 entrap the longitudinally extending ribs 166 therewithin and prevent the channel followers 152 from jumping the channels 148 defined in the track 120.

As is apparent from the drawings, the sliding door of the door assembly of the invention can be constructed in virtually any size. It can be any desired length and any desired height. This allows the aircraft 10 to have much larger access openings 16 than is possible with conventional aircraft door assemblies. The door assembly of the invention can be installed on either side of the aircraft and either forward or aft of the aircraft wing. For larger aircraft a full load carrying door according to the invention may require fuselage reinforcement to provide sufficient fuselage stiffness and door support during the opening and closing of the door.

Because the motion of the door is fore and aft close to the fuselage, and the door does not protrude outwardly from the fuselage, There is no restriction on the door operation even during high winds. The door can either be operated manually or it can be fully automatic. The structure of the door and the tracks may have a fail safe configuration, such as the type depicted in FIG. 8. Also, the door assembly of the invention may be fatigue tested to ensure that it is safe. The channel followers employed with the door tracks may or may not include anti-frictional features, such as rollers or lubricants.

While the embodiments depicted in the drawings show sliding aircraft door assemblies having the greatest economy and in which the door is not coplanar with the outer skin of the fuselage, a door employing a slide mechanism of the type depicted can be constructed so that the door is channeled into coplaner relationship with the fuselage when fully closed. This can be accomplished using added mechanisms and linkages.

Undoubtedly, numerous other variations and modifications of the invention will become readily apparent to those familiar with aircraft door assemblies. Accordingly, the scope of the invention should not be construed as limited to the specific embodiments illustrated and described, but rather as defined in the claims appended hereto.

We claim:

1. In an aircraft having a fuselage with a longitudinal axis and a protective skin through which an access opening is defined, the improvement comprising a pair of parallel tracks extending fore and aft relative to said longitudinal axis and located at the top and bottom of said access opening and spanning said access opening and anchored to said fuselage above and below said access opening in said skin, a door secured to said tracks and mounted only for sliding reciprocal translational movement and only along said tracks fore and aft relative to said longitudinal axis, and means for releasably immobilizing said door relative to said tracks.

2. An aircraft according to claim 1 wherein said tracks are comprised of projecting rails spaced outwardly from said protective skin to define channels therebetween and which are directed away from each other and from said access opening and parallel to said protective skin, and said door is provided with a mating set of rails which are directed toward each other and toward said access opening and which ride in said channels.

3. An aircraft according to claim 1 wherein said means for releasably immobilizing said door is comprised of a plurality of shear pins mounted within said fuselage and movable between extended positions of engagement with said door and retracted positions of withdrawal from said door.

4. An aircraft according to claim 3 further characterized in that a plurality of sockets are defined in said door to face said fuselage and said socket are adapted to receive said shear pins.

5. An aircraft according to claim 1 wherein said shear pins are mounted at the top and at the bottom of said access opening.

6. An aircraft according to claim 1 wherein said shear pins are mounted fore and aft of said access opening.

7. An aircraft according to claim 1 further comprising fairing at the edges of said door and on said protective skin about said opening.

8. An access closure for an aircraft having a fuselage with a protective skin and an access opening therein having upper and lower edges longitudinally aligned relative to said fuselage comprising: a pair of parallel tracks mounted on opposite sides of said access opening adjacent said upper and lower edges of said access opening and in alignment therewith, a sliding door secured to said tracks and mounted thereon for only reciprocal translational movement therealong fore and aft relative to the alignment of said fuselage, and releasable restraining means for immobilizing said door relative to said tracks.

9. An access closure according to claim 8 wherein said releasably restraining means is comprised of a plurality of shear pins adapted to be mounted on said fuselage and movable relative thereto between positions of engagement and positions of disengagement with said sliding door.

10. An access closure according to claim 9 further comprising means for moving said shear pins in unison.

11. An access closure according to claim 9 wherein said sliding door is faired into said fuselage.

12. An access closure according to claim 8 wherein said tracks are provided with rails which project away from said access opening and in opposite directions from each other to define a pair of channels, and said sliding door has upper and lower edges with channel followers thereon, wherein said channel followers ride in said channels in longitudinally reciprocal fashion.

13. A door assembly for an aircraft having a longitudinally aligned fuselage with an outer skin and an access opening therethrough having upper and lower edges longitudinally aligned relative to said fuselage comprising: a pair of tracks which are parallel to each other and secured to said fuselage adjacent said upper and lower edges of said access opening and in alignment therewith, a door secured to said tracks and mounted to slide only longitudinally with translational movement along said tracks fore and aft relative to said fuselage to alternatively cover and uncover said access opening, and releasably operable means for immobilizing said door relative to said tracks in a position covering said opening.

14. A door assembly according to claim 13 wherein said releasably operable means is comprised of a plurality of gang connected shear pins mounted on said fuselage and movable in unison to alternatively engage and disengage said door.

15. A door assembly according to claim 14 wherein said door has edges with sockets defined therein proximate to said edges to receive said shear pins.

16. A door assembly according to claim 13 wherein said door and said tracks include means for resisting hoop stress between said fuselage and said door.

17. A door assembly according to claim 13 further comprising means secured to said fuselage for laterally restraining the edges of said door adjacent said tracks.

* * * * *